United States Patent
Chen et al.

(10) Patent No.: US 7,871,100 B2
(45) Date of Patent: Jan. 18, 2011

(54) COLLAPSIBLE STROLLER

(75) Inventors: Shun-Min Chen, Taipei (TW); Zhi-Ren Zhong, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 251 days.

(21) Appl. No.: 12/076,567

(22) Filed: Mar. 20, 2008

(65) Prior Publication Data

US 2008/0238042 A1 Oct. 2, 2008

(30) Foreign Application Priority Data

Mar. 27, 2007 (CN) .................... 2007 2 0004761 U
Sep. 24, 2007 (CN) .................... 2007 2 0183370 U

(51) Int. Cl.
*B62B 7/06* (2006.01)
(52) U.S. Cl. .................... 280/642; 280/650; 280/647; 280/639; 280/47.41
(58) Field of Classification Search ......... 280/638–650, 280/47.38, 47.41
See application file for complete search history.

(56) References Cited

U.S. PATENT DOCUMENTS

| | | | | | |
|---|---|---|---|---|---|
| 5,806,877 | A | * | 9/1998 | Huang | 280/642 |
| 5,823,564 | A | * | 10/1998 | Kettler | 280/642 |
| 6,581,957 | B1 | * | 6/2003 | Lan | 280/642 |
| 7,185,909 | B2 | * | 3/2007 | Espenshade et al. | 280/642 |
| 7,410,185 | B2 | * | 8/2008 | Chen et al. | 280/642 |
| 7,571,925 | B2 | * | 8/2009 | Pike et al. | 280/642 |
| 2003/0201626 | A1 | * | 10/2003 | Hartenstine et al. | 280/642 |
| 2005/0242549 | A1 | * | 11/2005 | Longenecker et al. | 280/642 |
| 2006/0214396 | A1 | | 9/2006 | Horacek | |

FOREIGN PATENT DOCUMENTS

| | | |
|---|---|---|
| DE | 9414431.1 | 9/1994 |
| GB | 2399322 A | 9/2004 |
| WO | WO 2008/031099 A1 | 3/2008 |

* cited by examiner

*Primary Examiner*—J. Allen Shriver, II
*Assistant Examiner*—Erez Gurari
(74) *Attorney, Agent, or Firm*—Bacon & Thomas, PLLC

(57) ABSTRACT

A collapsible stroller is provided. The collapsible stroller comprises a frame body and a seat unit, wherein the frame body comprises: an upper frame unit consisting of two upper frame tubes; two connecting members connecting the two upper frame tubes to two front legs respectively and each connecting member having a first locking device; two base frame tubes pivotally coupled to the front legs respectively; two rear legs pivotally coupled between the connecting members and the base frame tubes respectively; and the seat unit comprises a seat portion, a backrest portion pivotally coupled to the seat portion, and two linking members disposed at two sides of the seat unit respectively, one end of each linking member thereof being pivotally coupled to the frame body and the other end being pivotally coupled to the seat portion so as to pivotally mount the seat unit to the frame body, wherein when the upper frame tubes pivotally collapsed with respective to the front legs, the upper frame unit, the front legs, the rear legs, the base frame tubes and the seat unit will move toward one another into a collapsed state in which they are substantially parallely stacked. The collapsible stroller of the present invention may further comprise baising device disposed at a joint between a supporting tube of the seat unit and the front leg to prevent the stroller being put into use before it reaches its completely expanded and locked state.

18 Claims, 8 Drawing Sheets

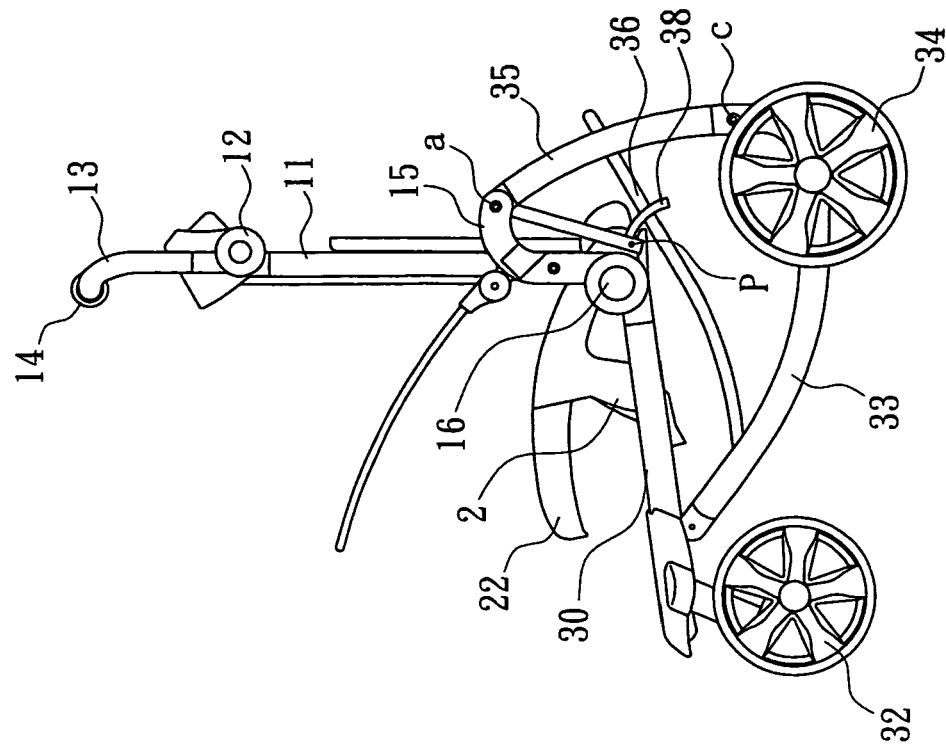
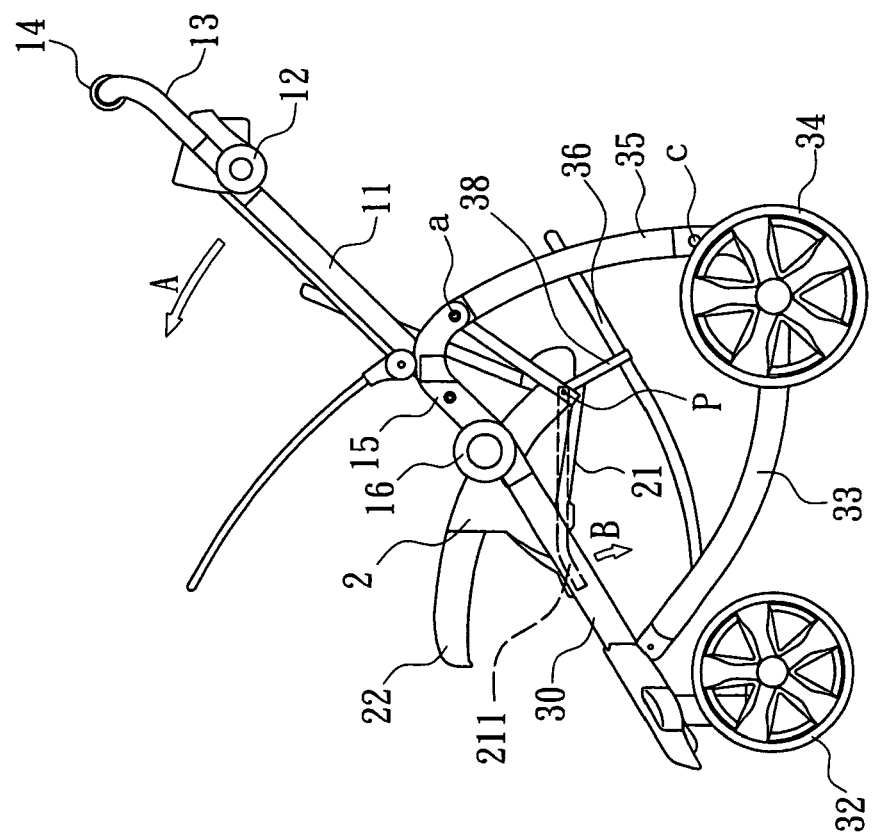
Fig.5A
Fig.5B

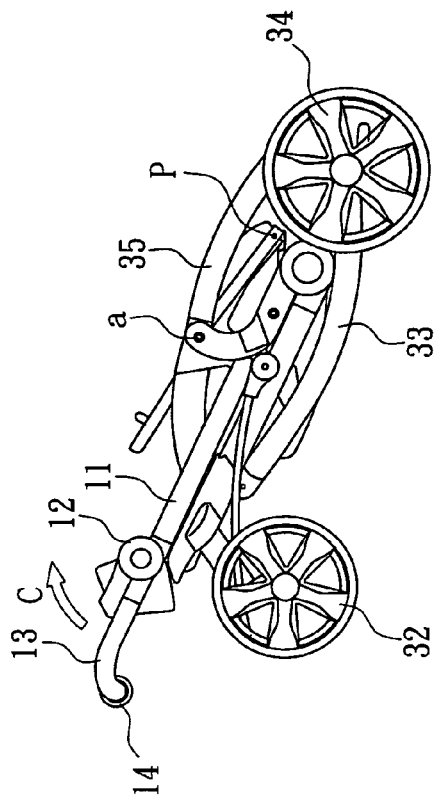
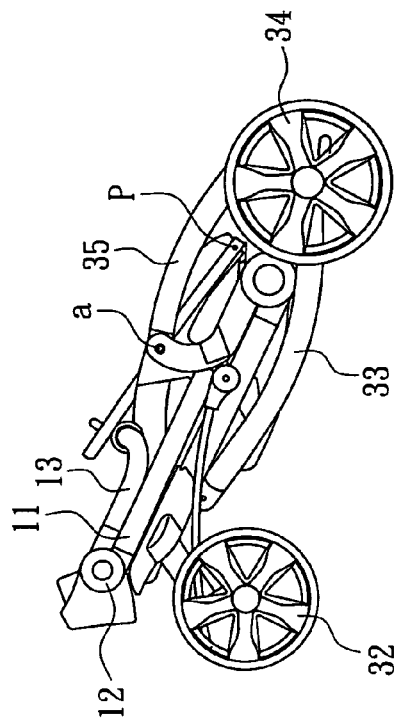
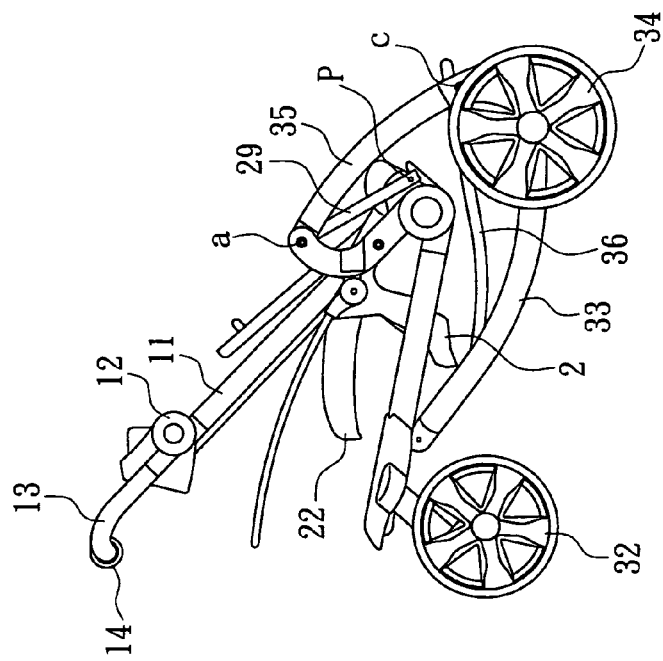
Fig.5D
Fig.5E
Fig.5C

COLLAPSIBLE STROLLER

FIELD OF THE INVENTION

The present invention relates generally to a collapsible stroller, and more specifically to a collapsible stroller that can be fully collapsed, can ensure a safe usage in a fully expanded, and is easy to operate.

BACKGROUND OF THE INVENTION

A stroller becomes necessary equipment for a family when the parents need to take their baby out, and it is usually designed in a collapsible form to facilitate transporting/storing. For instance, US patent application publication No. 2003/0201626 A1 has disclosed a collapsible stroller. Modern stroller usually has a number of attachments added thereto, such as, a child tray, a parent console, and grocery bag, etc., so as to improve the comfortableness and/or usage convenience of the stroller. These attachments make the volume of the stroller much bigger, and complicates the structure of the stroller, and causes the stroller is not easy to operate to its collapsed state and the stroller is unable to be fully collapsed. Thus, even the stroller is folded into its collapsed state its volume is still relatively large and is not easy for a user to carry and needs a large space for transporting/storage. In addition, due to its collapsible feature, a collapsible stroller may be put into use carelessness by the user before it locked in its completely expanded and this may cause the baby's limbs being injured by accidentally by getting caught between foldable components of the stroller.

Therefore, there exist a need for a collapsible stroller which not only can allows a user easy to operate the stroller to a collapsed state with a compact size but also can ensure that the stroller is used in a fully locking expanded state to avoid accident.

SUMMARY OF THE INVENTION

Accordingly, one object of the present invention is to provide a collapsible stroller which is easy to operate and all the stroller components are able to be fully collapsed while collapsing so as to achieve a compact volume.

Another object of the present invention is to provide a collapsible stroller that a user is sure the stroller is locked in its fully expanded so as to prevent potential injury from occurring.

To achieve these and other objects, a collapsible stroller is provided and it comprises:

a frame body comprising: an upper frame unit having two upper frame tubes, each having a first end and a second; two connecting member, each having a first portion and a second portion that is bent an angle with respect to the first portion, wherein the first portion is connected to the second end of the upper frame tube and a first locking device is provide at one of the first portion and the upper frame tube; two front legs, each having a first end and a second, wherein the first end is lockable/unlockable connected to the second end of the upper frame tube through the first locking device so that the upper frame unit is able to pivotally collapse toward the front leg while unlocked, and the second is coupled to a front wheel assemblies of the stroller; two base frame tubes, each having a first end pivotally coupled to the first end of the front leg and a second end, wherein a rear wheel of the stroller is rotatably installed to the base frame tube at a position close to the second end; two rear legs, each having a first end pivotally coupled to the first end of the second portion and a second end pivotally coupled to the second end of the base frame tube; and a seat unit including a seat portion, a backrest portion pivotally coupled to the seat portion, and two linking members disposed at two sides of the seat unit respectively, one end of each linking member thereof being pivotally coupled to the frame body and the other end being pivotally coupled to the seat portion, wherein when the upper frame tubes pivotally with respect to the front legs, the upper frame unit, the front legs, the rear legs, the base frame tubes and the seat unit will move toward each other into a collapsed state in which they are substantially parallely stacked.

According to this embodiment of the present application, the upper frame unit further comprises a substantially U-shaped handle having two end portions, wherein the two end portions are operably and lockably/unlockably coupled to the upper frame tubes respectively through a second lock/unlock device, such that the handle may be selectively folded toward the upper frame tubes. In this embodiment, a collapsing operation device is disposed on the handle and it is operable connected to the first locking device. The seat portion comprises armrests which are integrally formed. The seat portion further comprises a tray assembly detachably mounted to the armrests.

The seat unit further comprises a backrest adjusting mechanism which includes two backrest connecting parts each pivotally connecting to a rear end of the seat portion, wherein the backrest connecting part has an engaging structure disposed at a position opposite to the point connecting to the seat portion and the engaging structure has a number of engaging slots.

The backrest adjusting mechanism further comprises a actuating member which is operably mounted to the backrest portion and a backrest adjusting member which is connected to the actuating member and movable with respect to the backrest portion, and the backrest adjusting member may selectively engaging with one of the engaging slots of the engaging structure of the backrest connecting part by operating the actuating member so as to adjust the tilt angle of the backrest. The linking member is pivotally coupled to the backrest connecting part of the backrest adjusting mechanism such that the backrest connecting part is brought to rotate about a connecting point that it is coupled to the seat portion.

According to another embodiment of the present invention, the collapsible stroller may further comprises a baising device which is disposed in at least one of the pivotal connecting point of the front leg and the seat portion, the base frame tube and the rear leg, and the base frame tube and the front leg, and is arranged such that the baising device will bias the members of afore mentioned connected-in-pair-components toward each other if the first locking device does not lock the collapsible stroller in a fully expanded state.

The baising device may comprise at least one of the spring device, a pneumatic device, and a hydraulic pressure device. The baising device may comprise a torsional coil spring.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings, wherein:

FIGS. 5A-5E are side views illustrating the collapsing operation of the collapsible stroller according to the embodiment of the present invention.

DETAILED DESCRIPTION OF THE INVENTION

Figure 1:
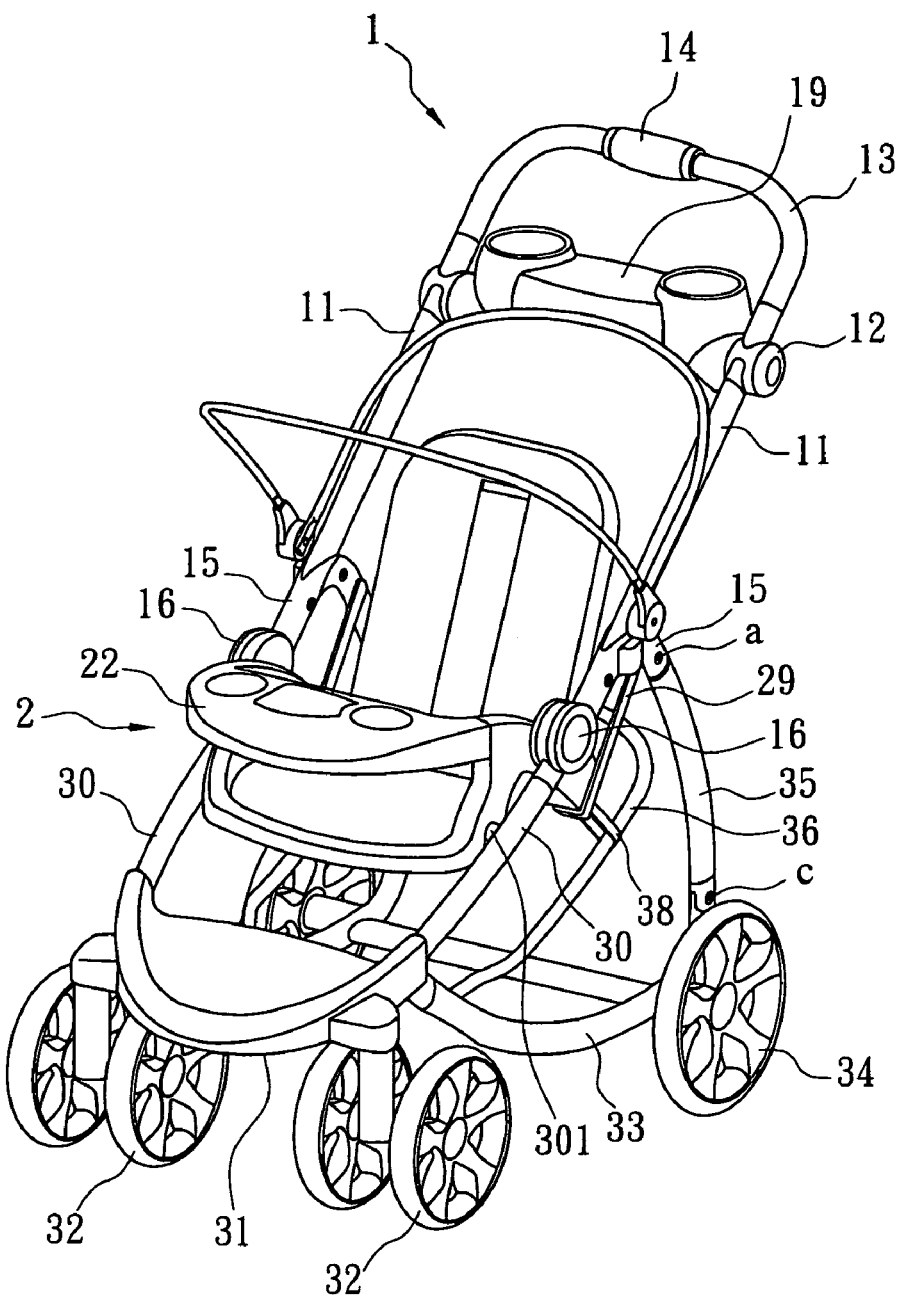
FIG. 1 is a perspective view of a collapsible stroller according to an embodiment of the present invention.

Referring now to the drawings in which an embodiment of the collapsible stroller are illustrated to describe the present invention.

FIG. 1 is a perspective view of a collapsible stroller according to the embodiment of the present invention, the collapsible stroller comprises a frame body 1, a seat unit 2 and a biasing device. The frame body 1 includes an upper frame unit having two upper frame tubes 11 and a substantially U-shaped handle 13, wherein one end (the first end) of each the upper frame tubes 11 is pivotally connected to two ends of the handle 13 respectively via a handle lock/unlock device (a second lock/unlock device) 12 and the handle lock/unlock device 12 is a well known manual operated lock/unlock device such that the handle 13 is able to be folded toward the upper frame tubes 11 to a position that is substantially parallel to the upper frame tubes 11 while the handle lock/unlock device 12 is in an unlocked state. The upper frame unit further comprises a collapsing operation device 14. In this embodiment, the collapsing operation device 14 is disposed on the handle 13 to facilitate the user to perform the collapsing operation of the stroller. The other end (the second end) of each of the upper frame tubes 11 is connected to one end (the first end) of each of two front legs 30 via a connecting member 15 respectively. The connecting members 15 are substantially L-shaped in this embodiment and fixed to the upper frame tubes 11. A pivotal connecting seat 16 is formed at a distal end of a portion (the first portion) of the connecting member 15 where it is substantially co-axial with the front leg 30, and a mating connecting seat is formed at the end of the front leg 30 that is pivotal connected to the connecting seat 16. A locking member (not shown) is operable disposed on the upper frame tube 11 or the connecting member 15 so as to selectively engage/disengage with the mating connecting seat of the front leg 30. The locking member is operable connected to the collapsing operation device 14 disposed on the handle 13 via a connecting element, such as a cable (not shown) running within the upper frame tube 11 and the handle 13, such that under the operation of the collapsing operation device 14, the upper frame tube 11 is selectively engaged/disengaged with the mating connecting seat of the front leg 30 by the locking member, thereby when the upper frame tubes 11 and the front legs 30 are in an unlocked state, the entire upper frame unit and the connecting members 15 is able to pivot about the connecting seat 16 and toward the front legs 30. In this embodiment, the other end (the second end) of each of the two front legs 30 is connected to each other by a transverse bar (not shown) and two front wheel assemblies 32 of the stroller are rotatably installed to two ends of the transverse bar respectively. A footrest 31 is disposed between the two front legs 30.

The stroller according to this embodiment further comprises two base frame tubes 33. One end of each of the two base frame tubes 33 is respectively connected to the front legs 30 at a position close to the footrest 31, and the other end thereof extending rearward with two rear wheels 34 of the stroller being respectively mounted thereto. The stroller according to this embodiment further comprises two rear legs 35 and one end of each of the two rear legs is pivotally coupled to the other portion (the second portion) of the connecting member 15, which is bent an angel, such as about 90 degree, from the first portion, at a connecting point a (see FIG. 5A), and the other end is pivotally connected to the base frame tube 33 at a position close to the rear wheel 34, and preferably connected to the base frame tube 33 at a position that passes the connection with rear wheel 34 and extends upwardly (i.e., the position c in FIG. 1).

Figure 2A:
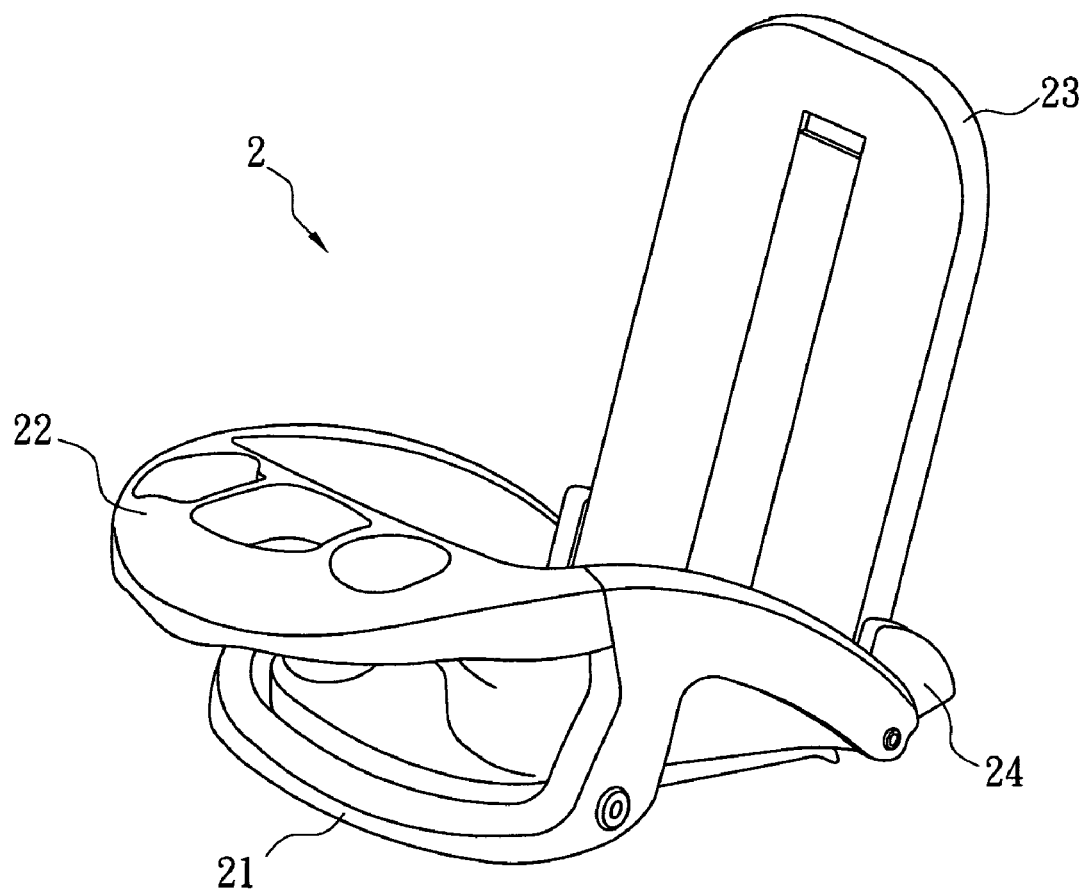
FIG. 2A is a perspective view of a seat unit of the collapsible stroller according to the embodiment of the present invention, wherein the seat unit includes an integrally formed seat portion.
Figure 2B:
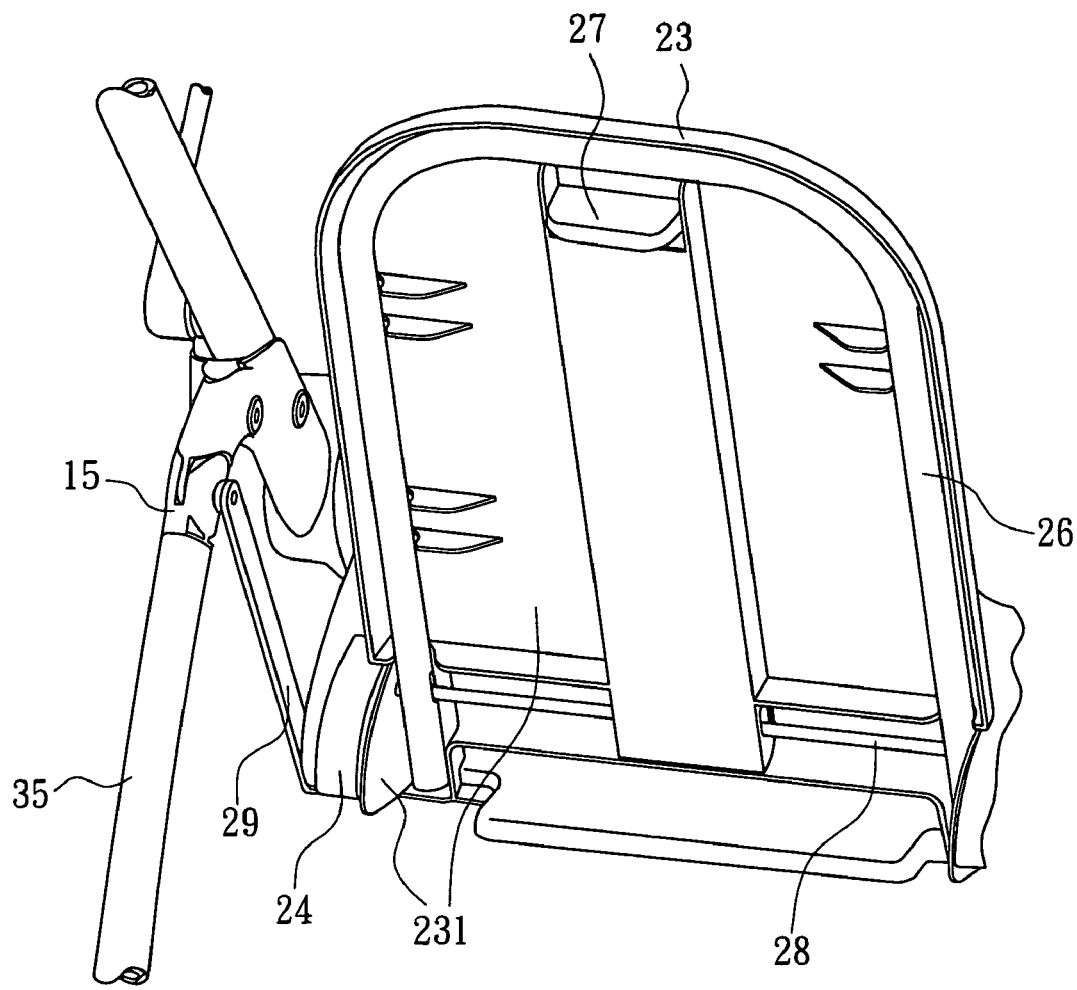
FIG. 2B is a rear, perspective view of an adjustable backrest of the seat unit of the collapsible stroller according to the embodiment of the present invention.
Figure 2C:
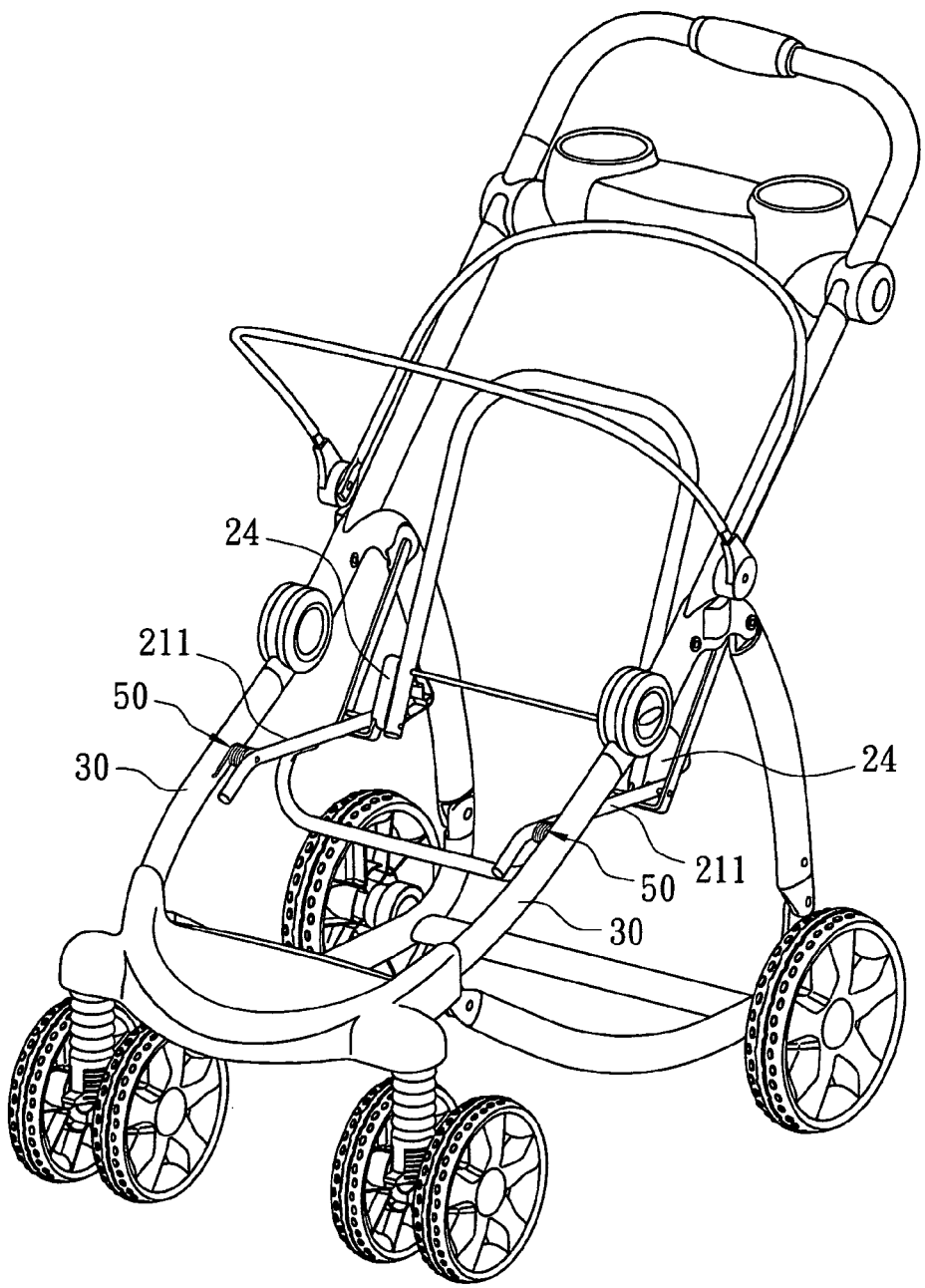
FIG. 2C is a perspective view of a seat unit of the collapsible stroller according to another embodiment of the present invention, wherein the seat unit includes a separately formed seat portion.

Next, the seat unit 2 will be described with reference to FIGS. 2A-2C, wherein FIG. 2A illustrates one embodiment of the seat unit 2 which includes a seat portion which is integrally formed, and FIG. 2C illustrate another embodiment which includes a seat portion which is not integrally formed.

Figure 3B:
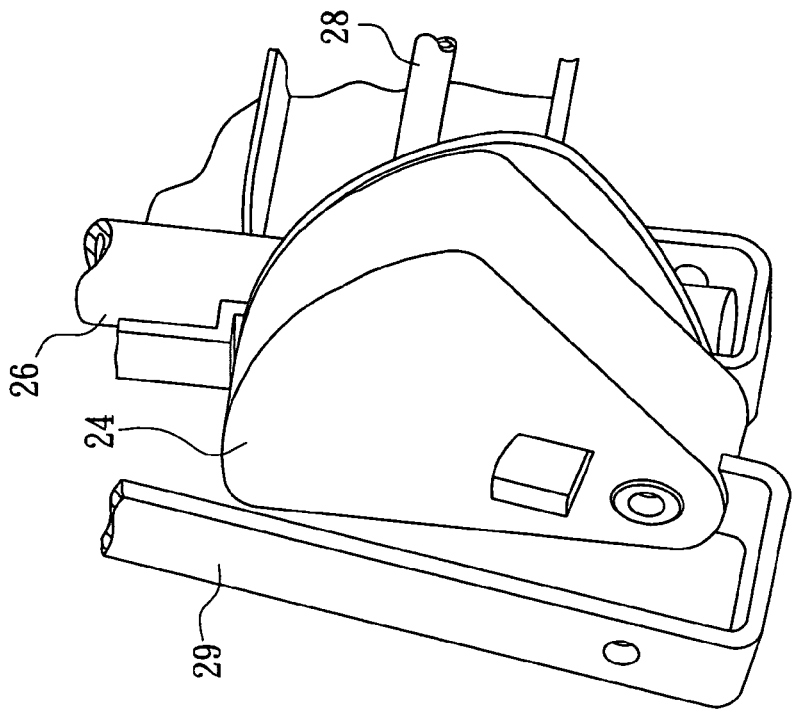
FIG. 3B is a left, perspective view of the backrest connecting part illustrated in FIG. 3A, wherein the seat portion and the armrest portion are removed for showing the connecting structure between the linking member and the backrest connecting member.
Figure 3A:
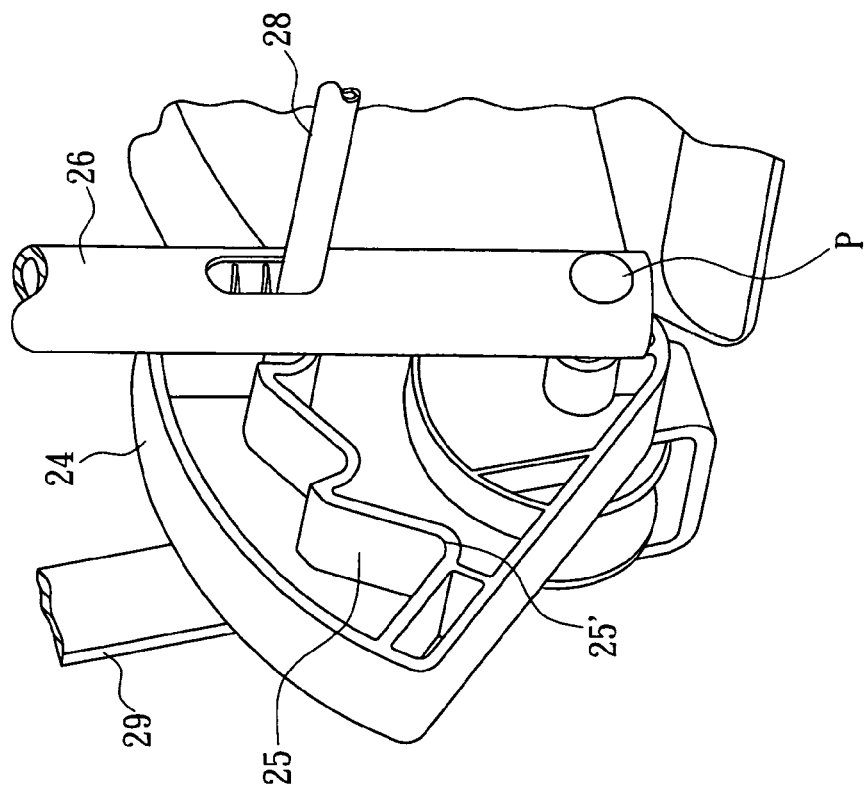
FIG. 3A is a right, perspective view of the backrest connecting part of collapsible stroller according to the embodiment of the present invention.

As shown in FIGS. 2A and 2B, the seat unit 2 comprises a seat portion 21 which has integrally formed seat and armrests, a tray assembly 22 detachably mounted to the armrests, an adjustable backrest 23, and a backrest adjusting mechanism. The backrest 23 includes a substantially U-shaped supporting tube 26 and a backrest plate 231. In this embodiment, the backrest plate 231 is fixed to the backrest supporting tube 26 by a rivet (point P in FIG. 5A). The backrest adjusting mechanism includes two reversed-triangle shaped backrest connecting parts 24 each respectively disposed at a rear inner side of the armrest and pivotally coupled to the armrest of the seat portion 21 at the point P. Two end portions of the backrest supporting tube 26 are pivotally coupled to the backrest connecting parts 24 at an apex of the backrest connecting part 24 (i.e., a position corresponding to P) to thereby connecting the backrest supporting tube 26 to the seat portion 21. The backrest connecting part 24 has an engaging structure 25 disposed at a position opposite to the apex and this engaging structure 25 includes a number of engaging slots 25' each tilted at an angle that is different from other engaging slots (see FIG. 3A). The backrest adjusting mechanism further comprises an actuating member 27 and a rod 28 connected to the actuating member 27 (see FIG. 2B). In other embodiment, the actuating member 27 may be installed directly to the supporting tube 26. The rod 28 extends between the two end portions of the supporting tube 26 and two ends of the rod 28 pass through the two end portions of the supporting tube 26 and enter the backrest connecting parts 24. The end portions of the rod 28 may selectively engage with one of the engaging slots 25' of the engaging structure 25 of the backrest connecting parts 24 by the operation of the actuating member 27 to adjust the tilting angle of the backrest 23. Additionally, the seat unit 2 is pivotally connected to the frame body 1 via a substantially L-shaped linking member 29 which is connected between the connecting member 15 at a position close to or at the connecting point with the rear leg 35 and the position where the backrest connecting part 24 coupled to the armrest (i.e., point P), wherein the linking member 29 is arranged such that when the linking member 29 rotates, it brings the backrest connecting part 24 to rotate about the connecting point of the backrest supporting tube 26 and the backrest connecting part 24 (i.e., point P), such as a short arm portion of the linking member 29 being inserted in the backrest connecting part 24 and rivet thereto to pivotally connect to the backrest connecting part 24 (see FIG. 3B).

In another embodiment illustrated in FIG. 2C, the seat portion 21 of the seat unit 2 comprises two supporting tubes 211, 211 and a cloth (not shown) mounted between the two supporting tubes 211, 211 to form a seat, wherein one end of each of the two supporting tubes 211, 211 is pivotally connected to the backrest connecting part 24 respectively and the other end is pivotally coupled to the front leg 30 respectively.

Figure 4A:
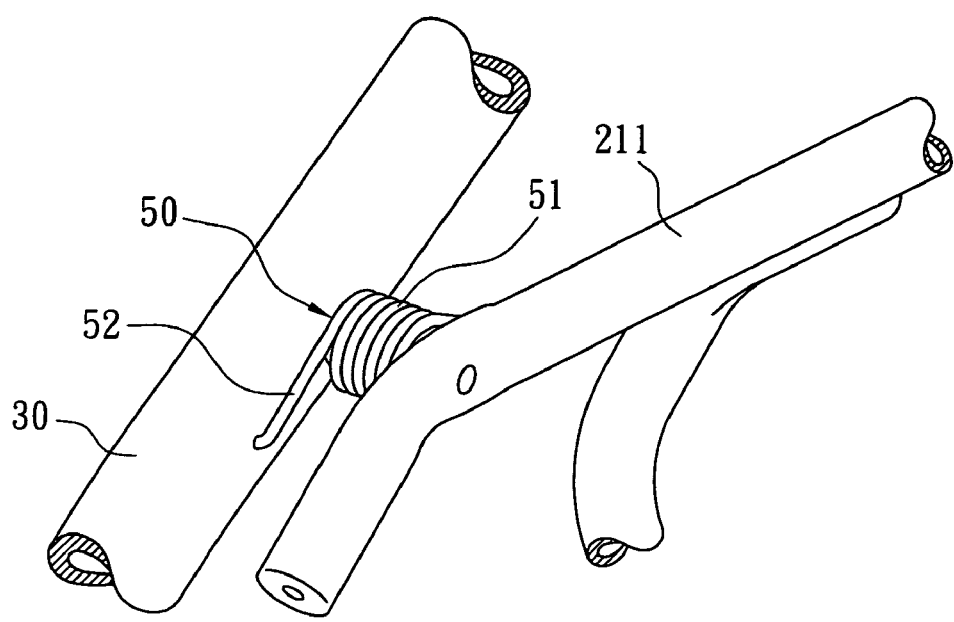
FIGS. 4A and 4B are perspective views illustrating the biasing spring of the collapsible stroller according to the embodiment of the present invention.
Figure 4B:
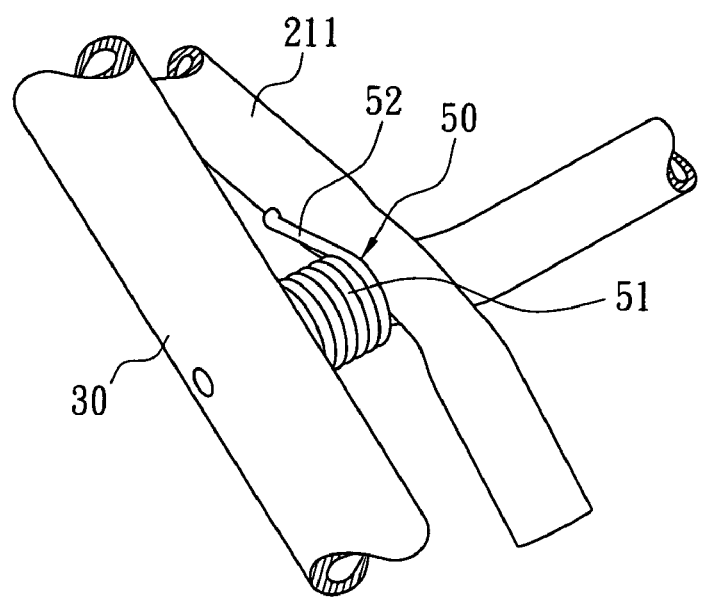

As shown in FIGS. 4A and 4B, the baising device in this embodiment is a torsion spring 50 which has a hollow body portion 51 to allow a fastener, such as a rivet, passing therethrough and two arms 52 extending outward from either ends of the body portion 51 respectively. The seat supporting tube 211 is pivotally connected to the front leg 30 via a rivet and the biasing spring 50 is disposed on the rivet thereof mounted between the seat supporting tube 211 and the front leg 30. As shown in FIGS. 4A and 4B, the two arm 52 of the biasing spring 50 are fixed to the seat supporting tube 211 and the front leg 30 respectively and are disposed such that when the seat supporting tube 211 and the front leg 30 are in a collapsed state in which the seat supporting tube 211 and the front leg 30 are substantially parallel with each other the spring 50 in its neutral untwisted state, and when the seat supporting tube 211 and the front leg 30 are in an expanded state in which the seat supporting tube 211 is at an angle with respect to the front leg 30 and the spring 50 is thus twisted to produce a torsional biasing force to force the seat supporting tube 211 and the front leg 30 to move toward each other, so that the seat supporting tube 211 and the front leg 30 are urged back to the collapsed state. Although the baising device in this embodiment is disposed between the seat supporting tube 211 and the front leg 30, it will be obvious to people skilled in this art that the baising device may be disposed at different locations. For instance, the baising device may be disposed between the front leg 30 and the base frame tube 33, between the base frame tube 33 and the rear leg 35, or between components that have relative movement with respect to other components while the stroller is folded or expended. Additionally, although the baising device in this embodiment is a torsion coil spring 50, people skilled in this art will appreciate that the baising device may be contemplated as other devices, such as a pneumatic device and a hydraulic pressure device.

As shown in FIG. 1, the stroller according to this embodiment further comprises a number of attachments to provide additional convenience. For instance, a parent console 19 is provide to the handle 13, and a substantially U-shaped basket tube 36 is provide between the seat unit 2 and the base frame tubes 33 to provide a support for a basket (not shown) wherein two ends of the basket tube 36 are pivotally connected to the two base frame tubes 33 at positions close to the footrest 31 respectively and the basket tube 36 is hung under the seat unit 2 by a strap 38 as illustrated. In spite of adding all these additional attachments, the space occupied by stroller according to this embodiment still can be reduced a minimal space while it is collapsed.

The collapsing operation of the collapsible stroller of the present invention will be described with reference to FIGS. 5A-5E.

The stroller shown in FIG. 5A is in a fully expanded state and when the stroller needs to be collapsed, the user first operate the collapsing operation device 14 disposed on the handle 13 to actuate the locking member (a first locking device) disposed on the upper frame tube 11 or the connecting member 15 to cause the upper frame tubes 11 unlocked from the front legs 30 and thus the upper frame tubes 11 and the handle 13 is able to pivot forwardly about the connecting seat 16 toward the front legs 30 (as indicated by arrow A), and the front legs 30 in turn pivot downwardly toward the base frame tubes 33 (as indicated by arrow B) and into a state in which they are substantially parallel to the supporting tubes 211 of the seat portion 21 of the seat unit 2 (i.e., the biasing spring 50 is not twisted), as shown in FIG. 5B. At this moment, when the upper frame tubes 11 and handle 13 are pivoted further forwardly and downwardly, the connecting members 15 will be caused to pivot about the connecting points a at which they connect to the rear legs 35 to a state illustrated in FIG. 5C. At the same time, the seat unit 2 will be brought by the linking members 29 to pivot downwardly about the connecting points P at which it connect to the backrest connecting parts 24 and cause the linking members 29 to rotate. The rotation of the linking members 29 results in the backrest connecting parts 24 to pivot about the connecting points at which the tube ends of the backrest supporting tube 26 coupled the backrest connecting parts 24 (i.e., point P in FIG. 3A) such that the backrest 23 will rotate simultaneously with the linking members 29 and collapse toward the seat 22. At the same time, the U-shaped basket tube 36, which is attached to the seat unit 2 by the strap 38, will be lower down along with the seat unit 2. When the stroller being further collapsed from the state shown in FIG. 5C, the rear legs 35 will pivot about the connecting points c at which they connect to the base frame tubes 33 to a state in which the upper frame tubes 11, the front legs 30, rear legs 35 and the base frame tubes 33 are substantially parallely stacked with each other, as shown in FIG. 5D. Then, the handle 13 may be folded backward toward the upper frame tubes 11 (as indicated by the arrow C) to the completely collapsed state shown in FIG. 5E by operating the handle lock/unlock device 12 to unlock the handle 13 from the upper frame tubes 11. If the backrest 23 is at a tilted position during the collapsing operation, then after afore mentioned operation is completed, the backrest 23 can be returned to the upright position by operating the actuating member 27 so as to achieve the completely collapsed state as shown in FIG. 5E. Alternative, this backrest operation may be performed before the stroller's collapsing operation.

When the stroller is to be used, the user only needs to extend the handle 13 outwardly and pull the collapsed stroller up by grasping the handle 13. At this moment, the base frame tubes 33, the front legs 30 and the rear legs 35 will pivot about respective connecting points successively to expand to a semi-expanded state as shown in FIG. 5B due to the their own weights as well as the weights of the front and rear wheels 32, 33. Then, the fully expanded state shown in FIG. 5A may be achieved by pushing the handle 13 and the upper frame tubes 11 backward and downward to cause the handle 13 and the upper frame tubes 11 to pivot about the connecting seat 16 and allow the locking member (first locking device) to lock the upper frame tubes 11 to the front tubes 30. At this time, the front legs 30 will pivot from a state in which they are substantially parallel to the seat supporting tubes 211 of the seat portion 21 to a state in which the front legs 30 are at an angle with respect to the seat supporting tubes 211, as shown in FIG. 5A, and the biasing spring 51 is thus twisted and torsional deformed.

If the stroller has not reached its fully expanded and locked in its expanded state as shown in FIG. 5A, the seat portion 21 of the seat unit 21 and the front legs 30 are unable to be separated from each other because the biasing force exerted thereon by the spring 50, thereby the user may notice that the stroller hasn't been locked in its fully expanded, and thus the potential danger of misuse may be effectively prevented.

It will be apparent to people skilled in this art that many modifications can be made to the disclosed structures without departing from the scope of the invention. Therefore, it is the intent of the appended claims to cover all such variations and modifications as come within the sprit and scope of this invention.

What is claimed is:

1. A collapsible stroller comprising:
    a frame body comprising:
        an upper frame unit having two upper frame tubes, each having a first end and a second end;
        two connecting members, each having a first portion and a second portion that is bent at an angle with respect to the first portion, wherein the first portion is connected to the second end of the upper frame tube and a first locking device is provided at one of the first portion and the upper frame tube;
        two front legs, each having a first end and a second end, wherein the first end is lockably/unlockably connected to the second end of the upper frame tube through the first locking device so that the upper frame unit is able to pivotally collapse toward the front leg while unlocked, and the second end is coupled to a front wheel assembly of the stroller;
        two base frame tubes, each having a first end pivotally coupled to the first end of the front leg and a second end, wherein a rear wheel of the stroller is rotatably installed to the base frame tube at a position close to the second end;
        two rear legs, each having a first end pivotally coupled to the second portion and a second end pivotally coupled to the second end of the base frame tube; and
    a seat unit including a seat portion, a backrest portion pivotally coupled to the seat portion, and two linking members disposed at two sides of the seat unit respectively, one end of each linking member thereof being pivotally coupled to the second portion of the connecting member and the other end being pivotally coupled to the seat portion,
    wherein when the upper frame tubes are pivotally moved with respect to the front legs, as a result the upper frame unit, the front legs, the rear legs, the base frame tubes and the seat unit will move toward each other into a collapsed state in which they are substantially parallely stacked,
    wherein the linking member is pivotally connected to the connecting member at the same pivotal point as the rear leg.

2. A collapsible stroller according to claim 1, wherein the upper frame unit further comprises a substantially U-shaped handle having two end portions, which are operably and lockably/unlockably coupled to the upper frame tubes respectively through a second lock/unlock device, such that the handle may be selectively folded toward the upper frame tubes.

3. A collapsible stroller according to claim 2, wherein the upper frame unit further comprises a collapsing operation device which is disposed on the handle and operable connected to the first locking device.

4. A collapsible stroller according to claim 1, wherein the seat portion comprises armrests which are integrally formed.

5. A collapsible stroller according to claim 4 wherein the seat portion further comprises a tray assembly detachably mounted to the armrests.

6. A collapsible stroller according to claim 1, wherein the seat unit further comprises a backrest adjusting mechanism which includes two backrest connecting parts each pivotally connecting to a rear end of the seat portion, wherein the backrest connecting part has an engaging structure disposed at a position opposite to the point connecting to the seat portion and the engaging structure has a number of engaging slots.

7. A collapsible stroller according to claim 6, wherein the backrest adjusting mechanism further comprises a actuating member which is operably mounted to the backrest portion and a backrest adjusting member which is connected to the actuating member and movable with respect to the backrest portion, and the backrest adjusting member may selectively engaging with one of the engaging slots of the engaging structure of the backrest connecting part by operating the actuating member so as to adjust the tilt angle of the backrest.

8. A collapsible stroller according to claim 6, wherein the linking member is pivotally connected to the backrest connecting part such that the backrest connecting part is brought to rotate about the connecting point at which it connects to the seat portion.

9. A collapsible stroller according to claim 1, wherein the two front legs further comprises a transverse bar which connects the second ends of the two front legs, and the front wheel assemblies includes two front wheels are rotatably installed to two ends of the transverse bar respectively.

10. A collapsible stroller according to claim 1, further comprising a footrest disposed between the two front legs.

11. A collapsible stroller according to claim 1, further comprising a substantially U-shaped tube to provide a support for a grocery bag, wherein two ends of the U-shaped tube are pivotally connected to the two base frame tubes where close to the first end of the base frame tubes respectively and the tube is hung under the seat unit by a strap.

12. A collapsible stroller according to claim 1, wherein each of the rear leg is connected to the second end of the base frame tube that is extended upwardly form the position close to the second end.

13. A collapsible stroller according to claim 1, wherein the first portion of the connecting member is formed with a first pivotal connecting seat which is able to lock/unlockably connected with the first lock/unlock device and the second end of the upper frame tube is formed with a second pivotal connecting seat which is inserted in the first pivotal connecting seat to pivotal connect thereto, and when the upper frame tube are unlockedly connected with the first locking device via the first pivotal connecting seat of the connecting member, the upper frame tube may collapse with respect to the front leg.

14. A collapsible stroller according to claim 1, further comprising a baising device which is disposed in at least one of the pivotal connecting point of the front leg and the seat portion, the base frame tube and the rear leg, and the base frame tube and the front leg, and is arranged such that the baising device will bias the members of afore mentioned connected-in-pair-components toward each other if the first lock/unlock device does not lock the collapsible stroller in a fully expanded state.

15. A collapsible stroller according to claim 14, wherein the baising device comprise at least one of the spring device, a pneumatic device, and a hydraulic pressure device.

16. A collapsible stroller according to claim 15, wherein the baising device comprises a torsion coil spring.

17. A stroller comprising:
   a frame body comprising:
      two upper frame tubes, each having a first end and a second end;
      two front legs, each having a first end and a second end, the first end pivotal connected to the second end of the upper frame tube respectively and the second end is coupled to a front wheel of the stroller;
      two base frame tubes, each having a first end pivotally coupled to the first end of the front leg and a second end, a rear wheel of the stroller is rotatably installed to the base frame tube at a position close to the second end;
      two rear legs, each having a first end pivotally coupled to the correspondent upper frame tubes and a second end pivotally coupled to the second end of the correspondent base frame tube,
   wherein the second end of the upper tube is pivotally connected to the front leg and the rear leg via a connecting member, the connecting member having a first portion and a second portion that is bent an angle with respect to the first portion, the first portion is connected between the second end of the upper frame tube and the front leg, the second portion is pivotally connected to the first end of the corresponding rear leg;
   a seat unit has a front side and a rear side, the front side pivotally connected to the front legs, the seat unit including a pair of armrests at two sides, the other end of each the linking member being pivotally connected to the corresponding armrest;
   two linking members, each has one end pivotally coupled to the frame body and the other end pivotally coupled to the rear side of the seat unit, the end of the linking member connected to the frame body being coupled to the second portion of the connecting member; and
   wherein when the stroller is movable from an expanded state and to a collapsed state, the upper frame tubes are pivotal toward the front leg and the seat unit is brought by the linking members to pivot relative to the front legs so that the front legs, the rear legs, the base frame tubes and the seat unit is moved toward each other to a compact size.

18. A collapsible stroller according to claim 17, wherein the one end of the linking member is pivotally connected to the first end of the rear legs.

\* \* \* \* \*